US010180580B2

(12) United States Patent
Giziewicz et al.

(10) Patent No.: US 10,180,580 B2
(45) Date of Patent: Jan. 15, 2019

(54) BEAM SPLITTING FOR LASER POWER MONITORING IN MOLDED OPTICAL COUPLING UNITS

(71) Applicant: FCI USA LLC, Etters, PA (US)

(72) Inventors: Wojciech Giziewicz, Berlin (DE); Alexander Eichler-Neumann, Berlin (DE); Ulrich Keil, Berlin (DE); Nicola Iwanowski, Berlin (DE)

(73) Assignee: FCI USA LLC, Etters, PA (US)

( * ) Notice: Subject to any disclaimer, the term of this patent is extended or adjusted under 35 U.S.C. 154(b) by 164 days.

(21) Appl. No.: 15/027,711

(22) PCT Filed: Oct. 9, 2014

(86) PCT No.: PCT/US2014/059830
§ 371 (c)(1),
(2) Date: Apr. 7, 2016

(87) PCT Pub. No.: WO2015/054455
PCT Pub. Date: Apr. 16, 2015

(65) Prior Publication Data
US 2016/0252733 A1    Sep. 1, 2016

Related U.S. Application Data

(60) Provisional application No. 61/888,941, filed on Oct. 9, 2013.

(51) Int. Cl.
*G02B 27/10* (2006.01)
*G02B 27/14* (2006.01)
*G02B 17/08* (2006.01)

(52) U.S. Cl.
CPC ......... *G02B 27/108* (2013.01); *G02B 17/086* (2013.01); *G02B 27/145* (2013.01)

(58) Field of Classification Search
CPC .... G02B 27/108; G02B 27/145; G02B 27/10; G02B 27/14; G02B 17/086; G02B 17/08
(Continued)

(56) References Cited

U.S. PATENT DOCUMENTS

| 6,328,485 B1* | 12/2001 | Hotta | G02B 6/4239 |
| | | | 385/94 |
| 6,895,147 B2* | 5/2005 | Posamentier | G02B 6/4214 |
| | | | 385/47 |

(Continued)

FOREIGN PATENT DOCUMENTS

| CN | 1761900 A | 4/2006 |
| CN | 102667565 A | 9/2012 |

(Continued)

OTHER PUBLICATIONS

International Search Report and Written Opinion for International Application No. PCT/US2014/059830 dated Jan. 27, 2015.

(Continued)

*Primary Examiner* — Seung C Sohn
(74) *Attorney, Agent, or Firm* — Wolf, Greenfield & Sacks, P.C.

(57) ABSTRACT

An optical module can include a beam steering portion and a first side defining an inner surface that faces the beam steering portion. The optical module can further include a second side that defines an inner surface adjacent to the inner surface of the first side. The inner surface of the second side can face the beam steering portion. The optical module can be configured to direct an initial light beam from the first side to the beam steering portion along a first direction. The optical module, and in particular the beam steering portion that can include a beam splitter, can divide the initial beam into a signal light beam and a fractional light beam.

20 Claims, 6 Drawing Sheets

(58) Field of Classification Search
USPC .................................. 250/578.1; 385/33–35
See application file for complete search history.

(56) References Cited

U.S. PATENT DOCUMENTS

| | | |
|---|---|---|
| 2002/0021872 A1 | 2/2002 | Althaus et al. |
| 2004/0179784 A1 | 9/2004 | Vancoille et al. |
| 2012/0263416 A1 | 10/2012 | Morioka |

FOREIGN PATENT DOCUMENTS

| | | |
|---|---|---|
| EP | 1178341 A2 | 2/2002 |
| JP | 2013-137507 A | 7/2002 |
| JP | 2012-108443 A | 6/2012 |
| JP | 2012-194454 A | 10/2012 |
| JP | 2013-020121 A | 1/2013 |
| WO | WO 2012/169587 A1 | 12/2012 |

OTHER PUBLICATIONS

International Preliminary Report on Patentability for International Application No. PCT/US2014/059830 dated Apr. 21, 2016.
Chinese Office Action for Chinese Application No. 201480055274.9 dated Jan. 26, 2018.

\* cited by examiner

Fig.8

BEAM SPLITTING FOR LASER POWER MONITORING IN MOLDED OPTICAL COUPLING UNITS

CROSS-REFERENCE TO RELATED APPLICATIONS

This application is the National Stage of International Application No. PCT/US2014/059830 filed Oct. 9, 2014, which claims the benefit of U.S. application No. 61/888,941, filed Oct. 9, 2013, the disclosures of which are incorporated herein by reference in their entireties.

BACKGROUND

Known optical modules may comprise plural elements to be positioned and aligned accurately, requiring delicate and specialist tools and techniques. Also, monolithic optical modules are known comprising a light first side, a light second side, and a beam steering portion in between. The beam steering portion may comprise reflective facets to alter the direction of propagation of the light beam within the optical module. Light exiting or re-entering the optical module through particular facets may exhibit further direction changes and lead to fractional light beams which may be used to tap and monitor the light beam.

There remains a desire for an improved optical module, facilitating mounting, use, and/or stability of the optical module. In particular, simple and robust construction and/or operation of assemblies comprising such optical modules are desired.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

In accordance with an example embodiment, an optical module is configured to direct light from a source to a receiver in an optical assembly. The optical module can include a beam steering portion and a first side defining an inner surface that faces the beam steering portion. The optical module can further include a second side that defines an inner surface adjacent to the inner surface of the first side. The inner surface of the second side can face the beam steering portion. The optical module can be configured to direct an initial light beam from the first side to the beam steering portion along a first direction. The optical module, and in particular the beam steering portion that can include a beam splitter, can divide the initial beam into a signal light beam and a fractional light beam. The optical module can be further configured to direct the signal light beam toward the second side, and direct the fractional light beam toward the first side along the first direction such that the fractional light beam at or near the first side is spaced from the initial light beam at or near the first side along a second direction that is substantially perpendicular to the first direction. The fractional light beam can be oriented substantially parallel to an orientation of the initial light beam at or near the first side.

BRIEF DESCRIPTION OF THE DRAWINGS

The foregoing summary, as well as the following detailed description of an example embodiment, are better understood when read in conjunction with the appended drawings. The invention is not limited, however, to the specific instrumentalities shown in the drawings. In the drawings.

DETAILED DESCRIPTION OF ILLUSTRATIVE EMBODIMENTS

For convenience, the same or equivalent elements in the various embodiments illustrated in the drawings have been identified with the same reference numerals. Certain terminology is used in the following description for convenience only and is not limiting. The words "left," "right," "front," "rear," "upper," and "lower" designate directions in the drawings to which reference is made. The words "forward," "forwardly," "rearward," "inner," "inward," "inwardly," "outer," "outward," "outwardly," "upward," "upwardly," "downward," and "downwardly" refer to directions toward and away from, respectively, the geometric center of the object referred to and designated parts thereof. The terminology intended to be non-limiting includes the above-listed words, derivatives thereof and words of similar import.

The present disclosure relates to an optical module for coupling a light beam between a source and a receiver, wherein the receiver may comprise an optical fiber for transmitting the light beam to a remote location.

Figure 1:
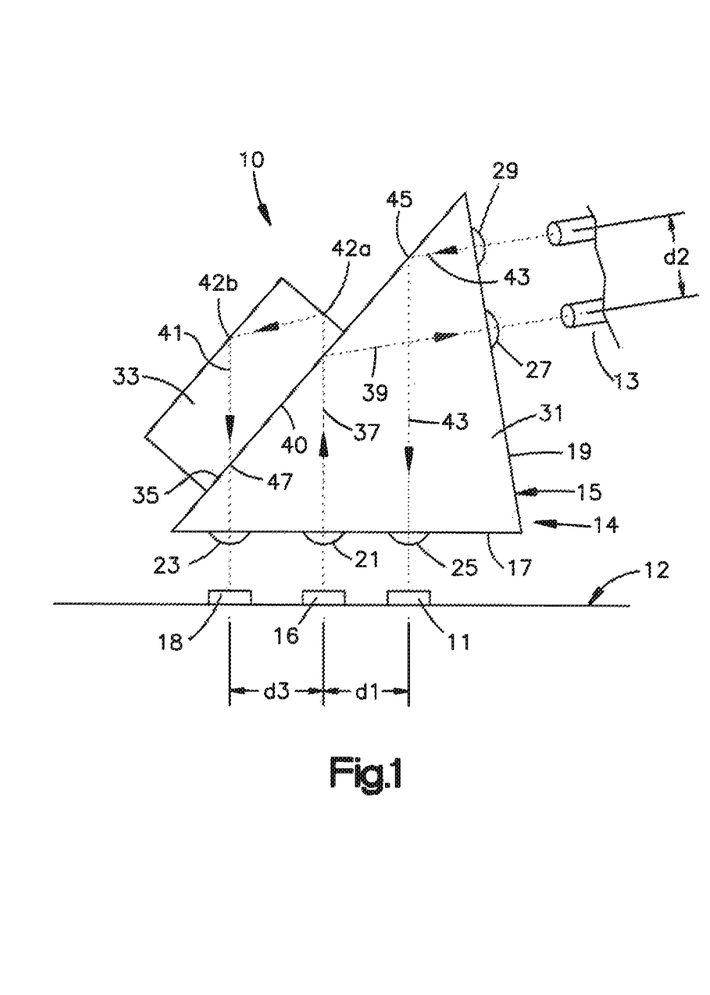
FIG. 1 shows an optical assembly comprising a circuit board and an optical module in accordance with an example embodiment.

Referring to FIG. 1, a cross section view of an optical assembly 10 is shown. The assembly 10 can include a circuit board 12 and an optical module 14 (only partly shown) spaced from the circuit board 12 along a first direction. As shown, the assembly 10 can define a generally constant shape along a direction perpendicular to the plane of the drawing. The assembly 10 can further include a first light source 16, a first photo detector 18, and a second photo detector 11 that are each disposed on the circuit board 12. The light source 16, the first photo detector 18, and the second photo detector 11 can be spaced apart from each other along a second direction that is substantially perpendicular to the first direction. In accordance with the illustrated embodiment, the light source 16 can be disposed between the first and second detectors 18 and 11 along the second direction, although the placement of the light source 16 can vary, as described below. The assembly 10 can further include an optical connector 13 (partly shown) that can be disposed adjacent the optical module 14. The light source 16 can include any suitable light source, such as light emitting diodes (LEDs), for instance laser diodes, light sources including lasers, or the like. The phone detectors 11 and 18 can include any suitable phone detector such as photo diodes or other types of receivers that are capable of converting incident light, for instance light pulses, into a detectable signal. The optical module 14 can be placed on an object, for instance the circuit board 12, such that the initial beam 37 can travel perpendicularly with respect to a plane defined by the object. Further, signal beam 39 can be oriented generally parallel to the plane defined by the object.

The optical module 14 can be configured to direct light from a source, for instance the light source 16, to a receiver, for instance a receiver of the optical connector 13, in the optical assembly 10. The optical module 14 can define a generally unitary transparent body 15 that includes a beam steering portion 40, a first side 17, and a second side 19 adjacent to the first side 17. The first side 17 can be oriented substantially parallel to a plane defined by the circuit board 12. The second side 19 can be oriented such that the second side 19 and the first side 17 each define inner surfaces that define an acute angle with respect to each other. The first side 17 can define an inner surface that faces the beam steering portion 40. The second side 19 can define an inner surface adjacent to the inner surface of the first side 17. The inner surface of the second side 19 can face the beam steering portion 40. It will be understood that the first side 17 and the second side 19 are not limited to the illustrated orientations, and thus the first 17 and the second side 19 can be alternatively oriented as desired. For instance, the first side 17 and the second side 19 can define different sides of the optical module 14 such that the orientation of the first side 17 and the orientation of the second side 19 are at an angle between 0 and 180 degrees, for instance 45, 90, or 135 degrees, with respect to each other to form an acute angle, a right angle, or an obtuse angle between the initial light beam 37 and the signal light beam 39.

As shown, the first side 17 can be disposed proximate to the circuit board 12, and the assembly 10 can include the connector 13 that can be disposed proximate to the second side 19. The first side 17 can define an outer surface opposite the inner surface of the first side 17. The first side can include one or more lenses, for instance lenses 21, 23, 25. Although three lenses 21, 23, 25 are shown in the illustrated embodiment, it will be understood that the first side 17 can include any number of lenses as desired. The lenses 21, 23, and 25 can protrude from the outer surface of the first side 17. The second side 19 can define an outer surface opposite the inner surface of the second side 19. The second side 19 can include one or more lenses, for lenses 27 and 29. Although two lenses 27 and 29 are shown in the illustrated embodiment, it will be understood that the second side 19 can include any number of lenses as desired. The lenses 27 and 29 can protrude from the outer surface of the second side. Further, the lenses 21, 23, 25, 27, and 29 can be spherical, ellipsoidal, and/or have any other suitable shape as desired. In addition to, or instead of the one or more lenses, the first and second sides can include other optical elements as desired.

The first side 17, the second side 19, and/or the beam steering portion 40 can include beam shaping portions such as lenses, prisms, polarizers, or the like. Such beam shaping portions may be integrated into an integral object of the module 14, in particular as appropriately shaped portions of a unitary transparent body 15.

An integral object, such as the body 15 for example, can facilitate manipulation of the optical module and increase robustness. A transparent object through which the light beams travel can increase robustness by hindering outside intervention with the light beams. Relying on total internal reflection can be highly predictable and can facilitate manufacturing and can reduce production costs as compared to providing reflective portions such as reflective coatings.

Still referring to FIG. 1, the transparent body 15 can include a first transparent portion 31 and a second transparent portion 33 attached to the first portion 31 at a contact face 35. Thus, the first portion 31 and the second portion 33 can define at least a portion of the contact face 35. The contact face 35 can be oriented in a direction so as to extend between, for instance connect, the first side 17 and the second side 19. The optical module 14 can further include the beam steering portion 40 that can be defined by the first portion 31 and the second portion 33, for instance at the contact face 35. The beam steering portion 40 can include a beam splitter and at least one reflective structure. The beam splitter can be a reflective beam splitter, for instance a mirroring facet. For instance, the first and second portions 31, 33 can have different indices of refraction and/or a beam splitting layer. In one example embodiment, the first portion 31 defines a first index of refraction, and the second portion 33 defines a second index of refraction that is different than the first index of refraction. By way of further example, a coating or an adhesive can be disposed between the first and second portions 31 and 33 to define the beam steering portion 40, for instance the beam splitter. The beam splitter can be formed by a coating, a glue, another deformable material that is hardened to a solid material, or the like. Thus, a reflective beam splitter can be formed with a predictable and reliable reflection coefficient determined by the difference in indices of refraction at the contact face 35.

The first and second portions 31 and 33 can include a polymeric material, for instance an acrylic material, a metacrylic material, a silicone material, and/or glass. The first and second portions 31 and 33 can be solid objects directly clamped, bonded, or otherwise held together. In an example embodiment, at least part of the second portion 33 is received by the first portion 31. Such an embodiment can allow the second portion 33 to be formed from a delicate material and/or in a delicate form, e.g. a very thin layer of a brittle material. In an embodiment, substantially all of the second portion 33 may be received by the first portion 31.

In use, and as shown in FIG. 1, the light source 16 can emit light that is incident on the optical module 14, and in particular on the lens 21, such that an initial light beam 37 is formed within the transparent body 15. The initial beam 37 can travel along the first direction so as to be oriented along the first direction. The initial beam 37 can be directed from the first side 17 to the beam steering portion 40 (see arrowheads). At the beam steering portion 40, the initial beam 37 can be divided into a signal light beam 39 and a fractional light beam 41. The signal light beam 39 can be reflected off of the beam steering portion 40, and directed toward the second side 19. At the second side 19, the signal beam 39 can exit the optical module 14 through the lens 27. In accordance with the illustrated embodiment, the signal beam 39 can enter the optical connector 13. The optical connector 13 can further transmit the signal beam 39, for instance to other equipment (not shown).

Thus, the optical module 14 can be configured to direct the initial light beam 37 from the first side 17 to the beam steering portion 40 along the first direction. The optical module, and in particular the beam steering portion that can include the beam splitter, can divide the initial light beam 37 into the signal light beam 39 and the fractional light beam 41. The optical module 14, in particular at least one reflective structure of the beam steering portion 40, can be further configured to direct the signal light beam 39 toward the second side 19. The optical module 14 can further be configured to direct the fractional light beam 41 toward the first side 17 along the first direction such that the fractional light beam at or near the first side 17 is spaced from the initial light beam 37 at or near the first side 17 along the second direction that is substantially perpendicular to the first direction. As shown, the fractional light beam 41 can be oriented substantially parallel to an orientation of the initial light beam 37 at or near the first side 17.

Because the initial beam 37 and the fractional beam 41 can be spaced from each other along the second direction, the beams can be addressed individually for manipulation, such as shaping or focusing for example. Because the beams 37 and 41 can be oriented parallel with respect to each other, the relative positions of the initial light beam 37 and the fractional light beam 41 can be constant such that alignment of the module 14 with respect to other equipment, such as the light source 16 for generating light for the initial beam 37 and the sensor (detector) 18 for detecting the fractional light beam 41, can be particularly robust and tight manufacturing tolerances can be met. Such an arrangement can increase the robustness of an optical assembly comprising the optical module 14 and/or can reduce manufacturing costs of such an assembly. It will be understood that the relative beam positions can be selected largely as desired. Consequently, one may have a significant freedom in designing an assembly comprising the module 14.

The second portion 33 can include one or more reflective portions, for instance first and second reflective portions 42a and 42b. Still referring to FIG. 1, in accordance with the illustrated embodiment, the second reflective portion 42b is oriented substantially parallel to the orientation of the contact face 35, and the first reflective portion 42a is oriented substantially perpendicular to the orientation of the second reflective portion 42b. As shown, the fractional light beam 41 can be transmitted from the beam steering portion 40 and into the second portion 33. Within the second portion 33, the fractional light beam 41 can be reflected off of the first and second reflective portions 42a and 42b, in succession, such that the fractional light beam 41 is directed back toward the first side 17. The fractional light beam 41 can be oriented generally parallel to the initial light beam 37 at or near the first side 17. For instance, the fractional light beam 41 at or near the first side 17 can be spaced from the initial light beam 37 at or near the first side 17 along the second direction that is substantially perpendicular to the first direction (see arrowheads in FIG. 1). The fractional light beam 41 can exit the optical module 14 through the first side 17, and in particular through the lens 23 that is spaced from the lens 21 along the second direction. The fractional light beam 41 can be directed onto the first detector 18 that is disposed on the circuit board 12. As shown, the reflections of the fractional light beam 41 are caused by the total internal reflection off of the outer facets of (the second portion 33 of) the transparent body 15, though it will be understood that one or more reflective coatings may be provided onto the transparent body 15, for instance the second portion 33 additionally or alternatively as desired.

Further, as shown, the beam steering portion 40 can be configured to define a beam path of the signal beam 39 toward the second side 19 from the initial light beam 37 by total internal reflection. The beam steering portion 40 can further be configured to define a beam path of the fractional light beam 41 toward the first side 17 by total internal reflection, for instance via the first and second reflective portions 42a and 42b. The beam steering portion 40, and in particular the beam splitter of the beam steering portion 40, can be configured to divide the initial light beam 37 into the signal light beam 39 and the fractional light beam 41 such that a power ratio of the signal light beam 39 as compared to the fractional light beam 41 is at least 96 to 4, for instance more than 98 to 2, for instance 99 to 1. Furthermore, as shown, the beam steering portion 40 can be configured to define a beam path of the signal light beam 39 toward the second side 19 such that an orientation of the initial light beam 37 at or near the first side 17 and an orientation of the signal light beam 39 at or near the second side 19 form an angle of about 90 to 110 degrees, for instance 100 degrees, with respect to each other. Thus, a minimum amount of power can be lost to the signal beam 39, whereas sufficient power for diagnostics can be available in the fractional light beam 41. Though the illustrated angle between the initial light beam 37 from the first side 17 and the signal light beam 39 toward the second side 19 is greater than 90 degrees, it will be understood that the angle can vary as desired.

Thus, in accordance with description herein, the optical module 14 can be configured as a retroreflector for part of the initial light beam 37, and a redirecting reflector for another part of the initial light beam 37 that can be used for signaling. In an example embodiment, the fractional light beam 41 can be used for on-line monitoring of an output (behavior) of the light source 16. The fractional light beam 41 can also be used for checking, for instance feedback and/or control, the light source 16 to identity causes of transmission problems, adapt the laser's power decreasing (e.g., due to aging), or the like. The fractional beam 41 can be detected by any suitable sensor and can be used to monitor parameters of the initial light beam 37 (e.g. power and/or power fluctuation, signal quality and/or signal to noise ratio, etc.).

As shown in the illustrated embodiment, the optical module 14 can be configured to direct a light beam from various sources to various receivers in the optical assembly 10. In particular, the optical connector 13 can provide a light beam transmitted from a remote source towards the optical module 14. This light beam can be incident on the optical module 14 so that, for instance assisted by the lens 29, a second light beam 43 can be formed within the transparent body 15. The assembly 10 can include the connector 13 that can include one or more light sources, for instance a second light source, configured to emit the second light beam 43 toward the second side 19. The connector 13 can further include the one or more detectors, for instance a third detector that can be configured to receive the signal light beam 39. The second light beam 43 can be directed from the second side 19 to a reflective portion 45 defined on the contact face 35. The reflective portion 45 can direct the light beam 43 to the first side 17 (see the arrowheads). The beam 43 can exit the first side 17, and thus the optical module 14, through the lens 25. As shown, the second light beam 43 can be directed onto the detector 11 after exiting the optical module 14.

With continuing reference to FIG. 1, the second beam 43 can be directed such that the second beam 43 is oriented substantially parallel to the initial beam 37 and the fractional light beam 41 at or near the first side 17. For instance, the second beam 43 can be spaced apart from the initial beam 37 and the fractional light beam 41 along the second direction at or near the first side 17. Thus, beam paths of second beam 43, the initial light beam 37, and the fractional light beam can extend substantially in a single plane. In an example embodiment, the reflective portion 45 can provide its reflectivity by fulfilling the requirements for total internal reflection of the second light beam 43. As shown, the optical module 14 can be further configured to direct the second light beam 43 from a second source (e.g., the connector 13) to the second detector 11, which can also be referred to as a second receiver 11, in the optical assembly 10, and the beam steering portion 40 can be further configured to direct the second light beam 43 from the second side 19 to the first side 17. Further, in an example embodiment, the beam steering portion 40 can include at least one reflective structure that can be configured to direct the second light beam 43 toward the first side 17 along the first direction such that the second light beam at or near the first side 17 is spaced from the initial light beam 37 and the fractional beam 41 at or near the first side 17 along the second direction. Thus, the second light beam 43 can be oriented substantially parallel to the orientation of the initial light beam 37 and the orientation of the fractional light beam 41 at or near the first side 17. The fractional light beam 41 can be between the initial light beam 37 and the second light beam 43 along the second direction at or near the first side (see FIG. 5). As shown in FIG. 1, the initial light beam 37 can be between the second light beam 43 and the fractional light beam 41 along the second direction at or near the first side 17. It will be understood that the order of the light beams along the second direction at the first side 17 can vary as desired.

As shown in FIG. 1, in accordance with the illustrated embodiment, the fractional beam 41 can re-enter the first portion 31 from the second portion 33 at a location 47 of the contact face 35. The location 47 may be configured to prevent losses, in particular reflection losses, to the fractional light beam 41. For instance, the location 47 can include a suitable layer for preventing losses between the first and second portions 31 and 33. In accordance with another embodiment, no intermediate material is provided at the location 47 between the first and second portions 31, 33.

As shown, the first and second sides 17 and 19, the beam steering portion 40, the first and second reflective portions 42a and 42b, and the reflective portion 45, can be arranged such that the signal light beam 39 and the second beam 43 are oriented at an angle of about 100 degrees with respect to the initial beam 37. The inner surfaces of the first and second sides 17 and 19 can be oriented at an angle of about 80 degrees with respect to each other. The inner surface of the first side 17 can be oriented at an angle of about 50 degrees with respect to an inner surface of the contact surface 35, and thus the beam steering portion 40. Similarly, the reflective surfaces 42b and 45 can be oriented at an angle of about 50 degrees with respect to the inner surface of the first side 17 such that conditions for total internal reflection and perpendicular incidence onto and exiting from the module 14 are met.

The light source 16 and the detector 11 can be separated along the first direction by a separation distance d1, which can be equal to a separation distance of the respective lenses 21 and 23 along the first direction. Thus, the light source 16 and the lens 21 can be aligned with each other along the first direction, and the detector 11 and the lens 23 can be aligned with each other along the first direction. Further, the initial light beam 37, at the first side 17, can be aligned with the lens 21 and the light source 16 along the first direction. The second beam 43, at the first side 17, can be aligned with the lens 23 and the detector 11 along the first direction. The lenses 27 and 29 can be separated from each other along a direction defined by the orientation of the second side 19 by a second separation distance d2. The second beam 43, at the second side 19, can be aligned with the lens 29, and the signal beam 39, at the second side 19, can be aligned with the lens 27 such that the beams 43 and 39 are spaced apart from each the second separation distance d2 at the second side 19. In an example embodiment, the first separation distance d1 is equal to the second separation distance d2.

The lenses may define focal lengths that are equal to each other such that the optical module 14 can be aligned with respect to the circuit board 12 and/or the connector 13. The optical connector 13 can be spaced from the circuit board 12 so as to define respective optical path lengths from the connector 13 to the circuit board 12 for transmitted beams (initial beam 37 and signal beam 39) and received beams (second beam) 43. The optical path lengths can be equal to each other so that signal running time along the optical beam paths may be equal to each other.

The lenses 21-29 can be formed together, for instance using molding techniques, with the first portion 31 such that the lenses are monolithic with the first portion 31.

Figure 2:
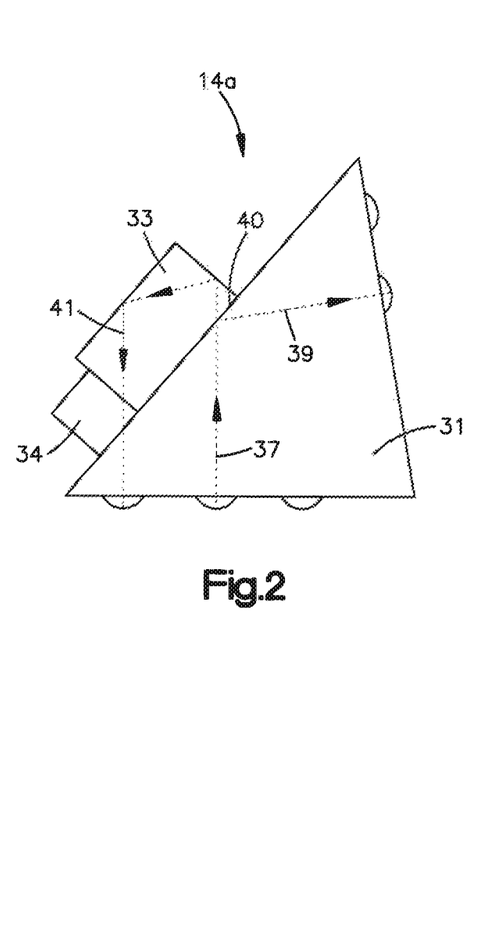
FIG. 2 shows another embodiment of an optical module.

Referring now to FIG. 2, another optical module 14a is shown that includes the first portion 31 that is substantially identical to the first portion 31 shown in FIG. 1. The optical module 14a includes a second portion 33 that is smaller as compared to the second portion 33 of FIG. 1. The optical module 14 further includes a third portion 34. As shown, the fractional light beam 41 can be directed along the same general beam path as depicted in FIG. 1, but the fractional light beam 41 of FIG. 2 can pass through the third portion 34. The fractional light beam 41 can further pass through interfaces between the second and third portions 33 and 34, and through interfaces between the third and first portions 34 and 31, respectively. The indices of refraction of the first, second, and third portions 31, 33, 34, and in particular the indices of refraction of the interfaces between the second and third portions 33, 34 and between the third and first portions 34, 31, can be configured such that losses to the fractional light beam 41 are minimized, e.g. by providing a suitable coating.

Figures 3, 4:
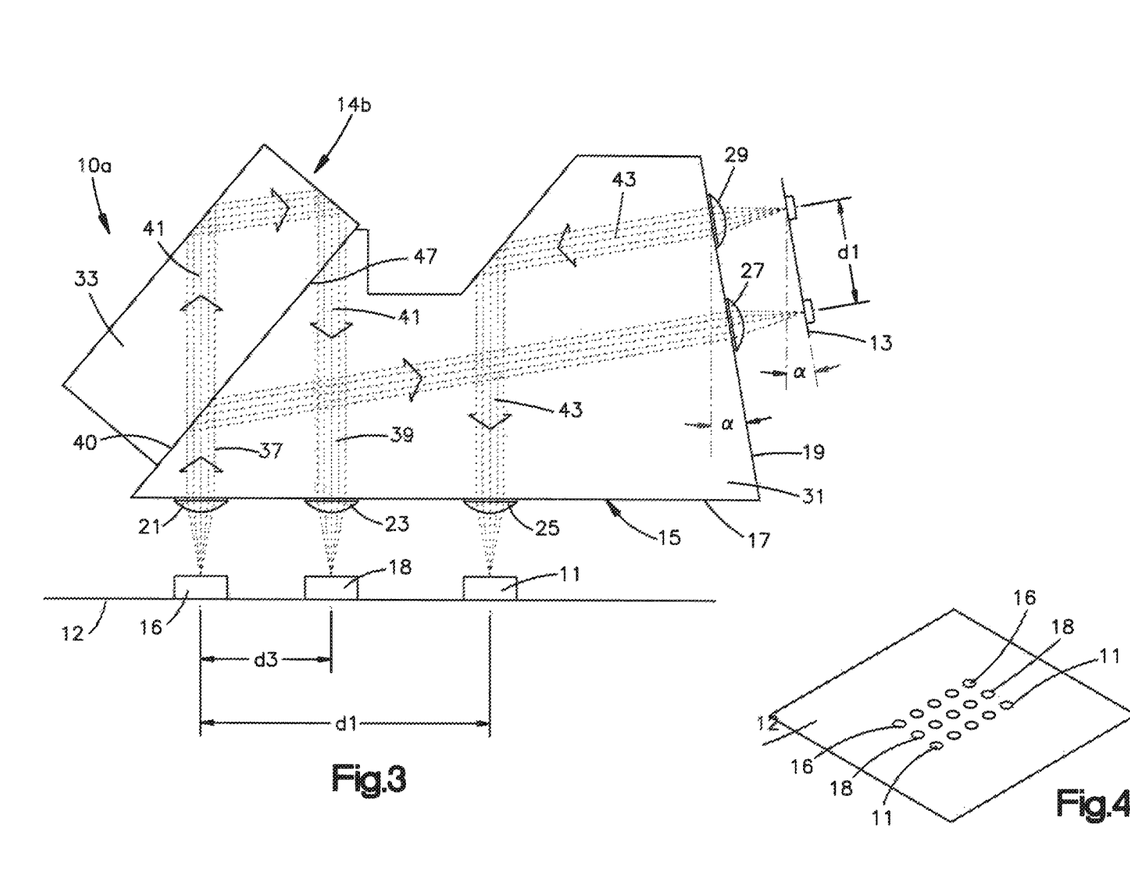
FIG. 3 shows another optical assembly in accordance with another embodiment.
FIG. 4 shows perspective view of a layout of the circuit board.

Referring now to FIG. 3, another assembly 10a is shown that is based on the same principles as explained in detail with respect to FIGS. 1-2. The assembly 10a includes an optical module 14b that includes a transparent unitary body 15 that includes first and second portions 31 and 33. As shown, the light source 16 can provide the initial light beam 37 that can be directed from the first side 17 to the beam steering portion 40 and divided into the signal beam 39, which is directed to the optical connector 13, and the fractional beam 41, which is re-directed to the first side 17 and the detector 18. The optical module 14b includes a beam splitting layer at a portion of the contact face 35. By applying the beam splitting layer between the first and second portions 31 and 33, the fractional beam 41 can be transmitted with little to no losses back into the first portion 31, at location 47. The second light beam 43 can be transmitted from the connector 13 and directed by the optical module 14b to the second detector 11.

Still referring to FIG. 3, in accordance with the illustrated embodiment, the reflection of the fractional beam 41 is along the same direction as the signal beam 39. Further, an order of the light beams 37, 41, 39 of FIG. 3 along the second direction at the first side 17 is different as compared to the order of the light beams 37, 41, 39 of FIG. 1 along the second direction at the first side 17. As shown, the detector 18 for the fractional beam 41 can be disposed between the light source 16 and the detector 18 along the second direction. The detector 18 can detect (receive) the fractional light beam 41. The illustrated arrangement of the light source 16 can allow multiple contacts to be attached to the light source 16 and can enable enhanced heat dissipation from the light source 16, as compared to the arrangement of FIGS. 1-2 in which the light source 16 is arranged between the detectors 18 and 11 along the second direction. The arrangement of FIG. 3 may be advantageous for arrangements that require a plurality of light sources 16 and detectors 18, 11 to be disposed adjacent each other on the circuit board 12, e.g. for parallel processing, as schematically shown in FIG. 4.

In the embodiment shown in FIG. 3, the light source 16 and the first detector 18 are spaced from each other along the second direction a third separation distance d3. The first separation distance d1, the second separation distance d2, and the third separation distance d3 can be different from each other. Further, it will be understood that the separation distances can vary as desired, for instance by altering dimensions of the body 15. Further, as shown, the second side 19 is oriented at an angle α with respect to the first direction.

Figure 5:
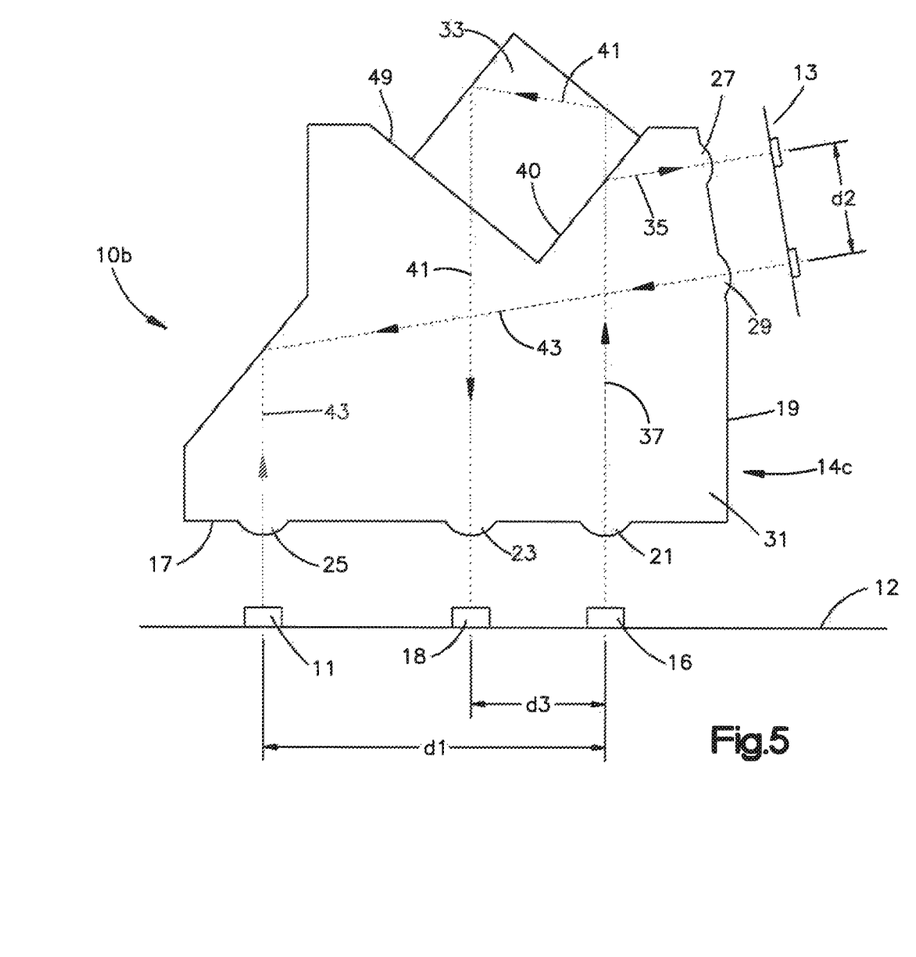
FIG. 5 shows another optical assembly in accordance with another embodiment.

FIG. 5 shows yet another assembly 10b that is based on the same principles as explained in detail with respect to FIGS. 1-3. The assembly 10b includes an optical module 14c that includes a first portion 31 and a second portion 33. As shown, the second portion 33 can be partially received in a recess 49 defined by the first portion 31. At least part of the second portion 33 can be received by the recess 49 that can be defined by the first portion 31. The illustrated arrangement of FIG. 5 can further facilitate efficient manufacturing. For instance, in accordance with the illustrated embodiment, the second portion 33 has a generally rectangular, for instance square, shape. The illustrated shape can facilitate manufacturing. The recess 49 can be manufactured by milling the first portion 31, and the first and second portions 31 and 33 may thus fit together on as to form a stable arrangement.

As indicated by the arrows and the reference symbols depicted in FIG. 5, the assembly 10 can include the light source 16 and the first and second detectors 18 and 11 arranged in an opposite order along the second direction as compared to an arrangement of the light source 16 and the first and second detectors 18 and 11 depicted in FIG. 3. As shown in FIG. 5, the first detector 18 can be disposed between the second detector 11 and the light source 16. The first detector 18 can be disposed closer to the second side 19 along the second direction as compared to the second detector 11. The shape of the transparent body 15 along the second direction of FIG. 5 can be narrower as compared to the shape of the body 15 along the second direction of FIG. 3. Further, the shape of the body 15 depicted in FIG. 5 can define a height as measured in the first direction that is greater than a height as measured along the first direction of the body 15 depicted in FIG. 3.

Figure 6:
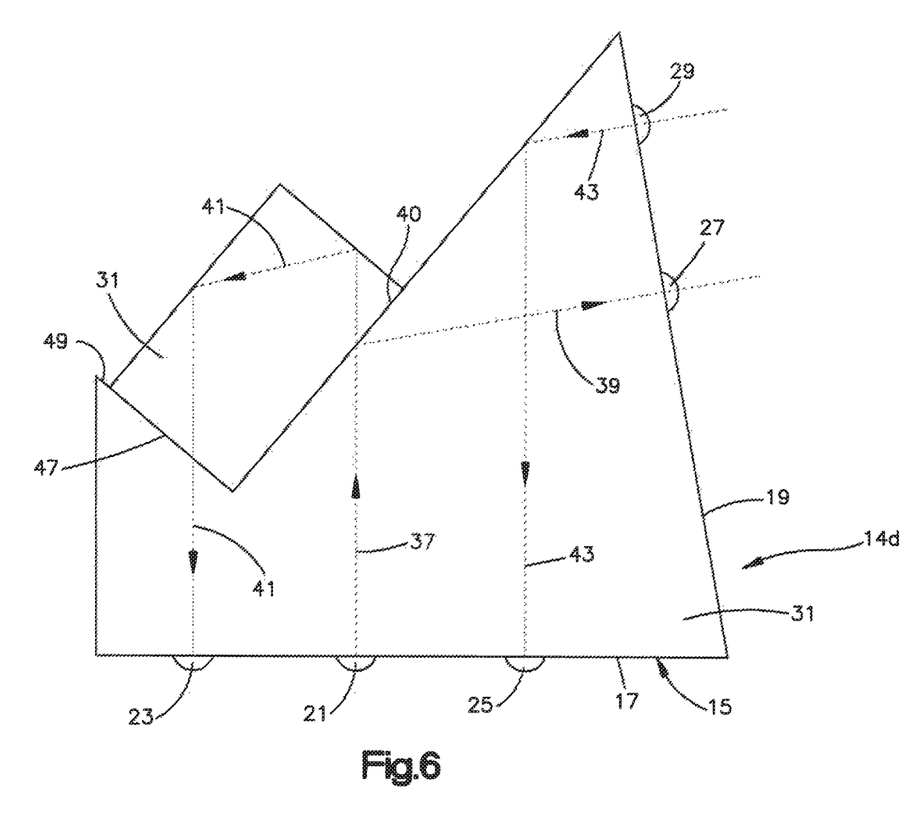
FIG. 6 shows another optical module in accordance with another embodiment.

FIG. 6 shows another optical module 14d in accordance with another example embodiment. As shown, the optical module 14 can be manufactured in an efficient manner, at least because of the shapes of the first portion 31 and the second portion 33. Referring to FIG. 6, the second portion 33 can be at least partly received in the recess 49 defined by the first portion 31. It will be understood that the optical module 14d can provide the same or similar arrangements of beams as described with respect to FIGS. 1 and 2.

Figure 7:
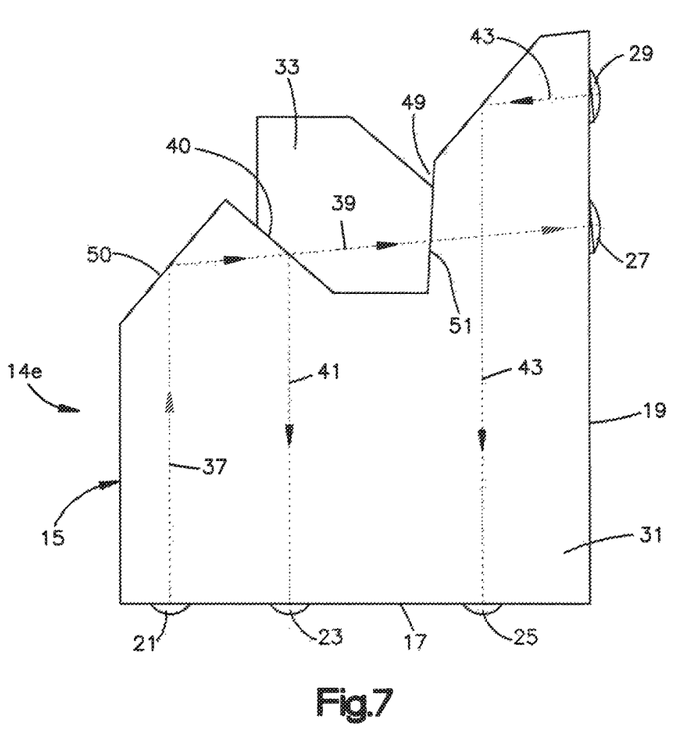
FIG. 7 shows another optical module in accordance with another embodiment.

FIG. 7 shows yet optical module 14e in accordance with yet another example embodiment. As shown, the optical module 14e includes a second portion 33 that is at least partly received in a recess 49 defined by the first portion 31. In accordance with the illustrated embodiment, the initial beam 37 can be directed to the beam steering portion 40, and in particular the beam splitter, with a reflection at a location 50. It will be understood that the reflection at the location 50 can be accomplished by total internal reflection or by a reflection off of a reflective portion. The beam steering portion 40, and in particular the beam splitter of the beam steering portion 40, can be configured such that a fraction, for instance a small fraction, of the initial light beam 37 is reflected so as to define the fractional light beam 41 that travels toward the first side 17. It will be understood that the beam splitter BS may be formed by a coating or a glue. It will further be understood that the first portion 31 can have a different index of refraction than the second portion 33 so as to form the beam steering portion 40, and in particular the beam splitter. In accordance with the illustrated embodiment, the second portion 33 can be shaped such that the beam splitter is at an appropriate angle so as to direct the fractional beam 41 to the lens 23 of the first side 17 directly, and such that the signal beam 39 can re-enter the first portion 31 with little to no losses at a location 51. At location 51, an anti-reflection coating or a glue with the same index of refraction as the first and second portions 31, 33 may be provided to further reduce losses of the signal beam 39. As shown, the initial light beam 37 at the first side 17 can be further from the second side 19 along the second direction than the second beam 43 at the first side 17. The fractional light beam 41 can be between the initial light beam 37 and the second beam 43 along the second direction at the first side 17.

Still referring to FIG. 7, in accordance with the illustrated embodiment, the second side 19 can be oriented substantially perpendicular to the first side 17. Thus, the inner surface of the first side 17 and the inner surface of the second side 19 can define an angle of approximately 90 degrees with respect to each other. Further, as shown, the lenses 27 and 29 can be tilted away from the second direction such that the respective beams 39 and 43 can extend generally paraxial to the lenses 27 and 29.

Figure 8:
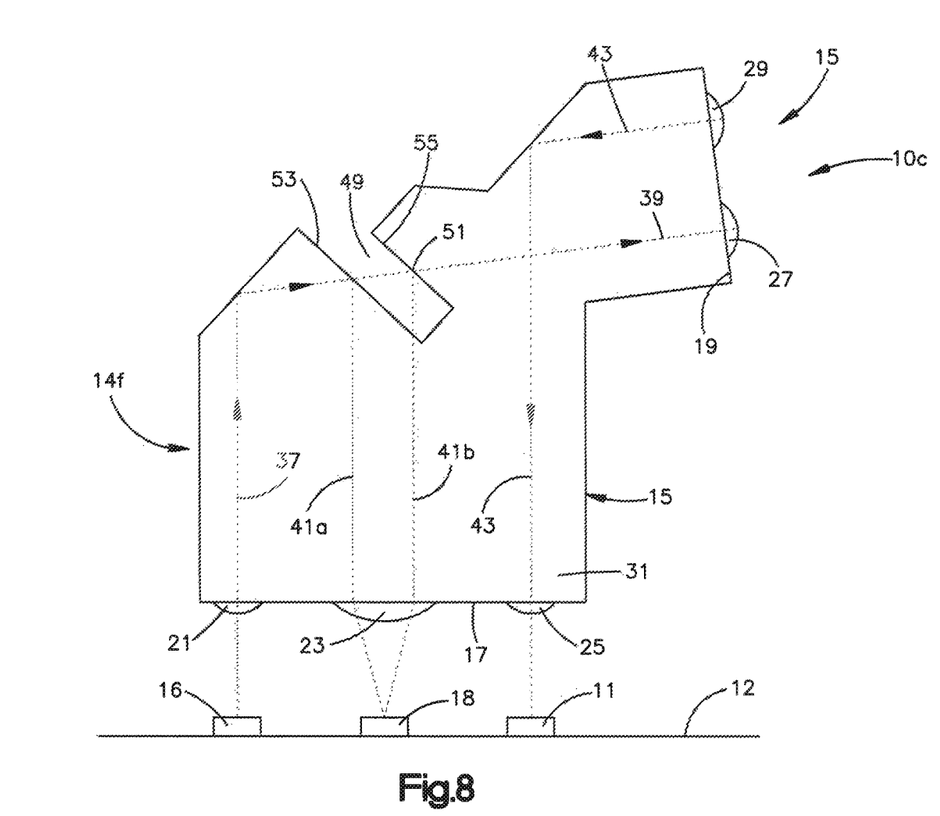
FIG. 8 shows another optical assembly in accordance with another embodiment.

FIG. 8 shows yet another optical assembly 10c in accordance with yet another embodiment. The optical assembly 10c includes an optical module 14f that is generally to the optical module 14e depicted in FIG. 7. As shown in FIG. 8, the first portion 31 can define a generally rectangular slot-shaped recess 49. The first portion can include a first face 53 and a second face 55 spaced from the first face 53 so as to define the recess 49. The faces 53 and 55 can be substantially parallel to each other. The recess 49 can be filled by inserting therein a solid object, for instance a solid object that performs like the second portion 33 described above. For instance, the first portion 31 can be molded around the solid object. Alternatively, still referring to FIG. 8, the recess 49 can be filled with a deformable substance, the deformable substance can harden. Such a technique can be used to facilitate efficient manufacturing and can be used to meet tolerances of the optical module. A desired beam splitting effect, such as the beam splitting effects described herein, can then be provided by selecting materials with suitable indices of refraction, and/or leaving the recess open and air-filled (or filling the recess with other material such as an inert gas or a liquid). As shown in FIG. 8, the initial beam 37 can be directed to the beam steering portion 40 after an initial reflection at location 50, and the signal beam 39 can traverse the recess 49. Further, in various embodiments in which the recess is filled with a material, such as the second portion 33, the signal beam 39 can traverse the material. Due to the parallel faces 53 and 55 of the recess 49, first and second fractional beams 41a and 41b can be formed. The first and second beams 41a and 41b can be reflected along the first direction toward the first side 17 so as to be parallel to each other. The signal beam 39 can be offset (not visible in FIG. 8) along the first direction by traversing a material, for instance the second portion 33, that is disposed in the recess 49, wherein the material can have a different index of refraction than the surrounding medium (first portion 31).

While the signal beam 39 can be offset along the first direction by the recess 49, the orientation of the signal beam 39 can be unchanged by the recess 40. Such an arrangement can increase robustness of the module 14f under thermal fluctuations. The separation of the first and second fractional beams 41a and 41b along the second direction can depend on a width of the recess 49, which can be defined by a distance that the first and second faces 53 and 55 are spaced from each other. In an example embodiment, the first and second fractional beams 41a and 41b can be detected by a single detector, for instance the first detector 18. One or more optical elements such as a lens 23, prisms, mirrors and/or other optical elements may be provided to combine the two fractional beams 41a and 41b onto a single detector as desired. Alternatively, the first and second fractional beams 41a and 41b can be directed to different detectors e.g. for monitoring different characteristics of the signal beam 39.

A method of manufacturing the above-described optical module can include forming a first transparent portion having a first index of refraction such that the first transparent portion includes a 1) first side defining an inner surface that faces the beam steering portion, and 2) a second side defining an inner surface adjacent to the inner surface of the first side, the inner surface of the second side facing the beam steering portion; forming a second transparent portion having a second index of refraction; and attaching the first transparent portion to the second transparent portion at a contact surface to define the beam steering portion.

The method can further include applying a deformable material at the contact surface of at least one of the first and second transparent portions. The method can further include forming one of the first and second transparent portions so as to define a recess; and placing the other of the first and second transparent portions into the recess.

In particular, the second or first transparent portion can be formed by applying a deformable, hardenable material, e.g. by setting and/or curing, against or into at least part of the first or second, respectively, transparent body, and allowing the material to harden, e.g. by curing.

The invention is not restricted to the above described embodiments which can be varied in a number of ways within the scope of the claims. For instance aspect ratios of the optical module may differ to suit different preferred spacings of beams and/or to ascertain fulfilling requirements for angles of incidence and/or reflection, in particular requirements for total internal reflection with the combinations of indices of refraction of the materials used.

One or more portions of the optical modules may be provided with anti-reflection coatings.

The optical module may comprise a further beam splitter to divide a further fractional light beam off the signal beam and/or off the second beam. Then the module may comprise beam shaping portions configured to direct the fractional light beam and the further fractional light beam to a common spot outside of the optical module.

Further reflective and/or refractive portions may be provided to provide desire beam paths.

Elements and aspects discussed for or in relation with a particular embodiment may be suitably combined with elements and aspects of other embodiments, unless explicitly stated otherwise.

In various embodiments, as described above, the first side comprises a plurality of light input structures for respective initial beams and light output structures for associated respective fractional beams, preferably being arranged in an array, and the second side comprises a plurality of light output structures for associated respective signal beams, preferably arranged in an array, in particular an array corresponding with the array arrangement of the first side where applicable. In some embodiments, the second side comprises a plurality of light input structures for respective further light beams and the first side comprises a plurality of light output structures for the further light beams. Such embodiments facilitate use of the optical module with multiple parallel optical signals. An array arrangement simplifies mounting and/or alignment of the module and other equipment with respect to each other.

A further aspect of this disclosure in accordance with an embodiment is an assembly comprising an optical module as disclosed herein and one or more light sources and one or more light detectors. The one or more light sources are configured and arranged with respect to the optical module to provide one or more associated initial light beams and the one or more light detectors are configured and arranged with respect to the optical module to receive and detect light from one or more respective associated fractional light beams. In particular the assembly may comprise one or more further light detectors configured and arranged with respect to the optical module to receive and detect light from one or more further light beams.

Thus, the embodiments described in connection with the illustrated embodiments have been presented by way of illustration, and the present invention is therefore not intended to be limited to the disclosed embodiments. Furthermore, the structure and features of each the embodiments described above can be applied to the other embodiments described herein, unless otherwise indicated. Accordingly, the invention is intended to encompass all modifications and alternative arrangements included within the spirit and scope of the invention, for instance as set forth by the appended claims.

What is claimed:

1. An optical module configured to direct light from a source to a receiver in an optical assembly, the optical module comprising:
   a beam steering portion;
   a first side defining an inner surface that faces the beam steering portion;
   a second side defining an inner surface adjacent to the inner surface of the first side, the inner surface of the second side facing the beam steering portion, wherein the optical module is configured to:
   direct an initial light beam from the first side to the beam steering portion along a first direction;
   divide the initial light beam into a signal light beam and a fractional light beam;
   direct the signal light beam toward the second side; and
   direct the fractional light beam toward the first side along the first direction such the fractional light beam at or near the first side is spaced from the initial light beam at or near the first side along a second direction that is substantially perpendicular to the first direction.

2. The optical module as recited in claim 1, wherein the factional light beam is oriented substantially parallel to an orientation of the initial light beam at or near the first side.

3. The optical module as recited in claim 1, wherein the optical module defines a generally unitary body including the first side, the second side, and the beam steering portion.

4. The optical module as recited in claim 3, wherein the beam steering portion is configured to define a beam path of the signal light beam toward the second side from the initial light beam by total internal reflection.

5. The optical module as recited in claim 3, wherein the beam steering portion is configured to define a beam path of the fractional light beam toward the first side by total internal reflection.

6. The optical module as recited in claim 1, wherein the beam steering portion is configured to define a beam path of the signal light beam toward the second side such that an orientation of the initial light beam at or near the first side and an orientation of the signal light beam at or near the second side form an angle of about 90 to 110 degrees with respect to each other.

7. The optical module as recited in claim 1, wherein the optical module further comprises:
a first portion that defines a first index of refraction;
a second portion that defines a second index of refraction different than the first index of refraction, the second portion attached to the first portion at a contact face,
wherein a beam path of at least one of the initial light beam, the signal light beam, and the fractional light beam extend through the first portion, the second portion, and the contact face.

8. The optical module as recited in claim 7, wherein at least part of the second portion is received by a recess defined by the first portion.

9. The optical module as recited in claim 1, wherein the beam steering portion includes a beam splitter formed by a coating, a glue, or a deformable material that is hardened to a solid material.

10. The optical module as recited in claim 1, wherein the beam steering portion is configured to divide the initial light beam into the signal light beam and the fractional light beam such that a power ratio of the signal light beam as compared to the fractional light beam is at least 96 to 4.

11. The optical module as recited in claim 1, wherein the optical module further is further configured to direct a second light beam from a second source to a second receiver in the optical assembly, and the beam steering portion is configured to direct the second light beam from the second side to the first side.

12. The optical module as recited in claim 11, wherein the beam steering portion includes at least one reflective structure configured to direct the second light beam toward the first side along the first direction such that the second light beam at or near the first side is spaced from the initial light beam and the fractional beam at or near the first side along the second direction.

13. The optical module as recited in claim 12, wherein the second light beam is oriented substantially parallel to an orientation of the initial light beam and an orientation of the fractional light beam at or near the first side.

14. The optical module as recited in claim 12, the fractional light beam is between the initial light beam and the second light beam at or near the first side.

15. An assembly comprising:
an optical module including 1) a beam steering portion, 2) a first side defining an inner surface that faces the beam steering portion, and 3) a second side defining an inner surface adjacent to the inner surface of the first side, the inner surface of the second side facing the beam steering portion,
wherein the optical module is configured to:
direct an initial light beam from the first side to the beam steering portion along a first direction;
divide the initial light beam into a signal light beam and a fractional light beam;
direct the signal light beam toward the second side; and
direct the fractional light beam toward the first side along the first direction such the fractional light beam at or near the first side is spaced from the initial light beam at or near the first side along a second direction that is substantially perpendicular to the first direction;
a first light source configured to emit the initial light beam toward the first side; and
a first detector spaced from the first light source along the second direction, the first detector configured to receive the fractional light beam.

16. The assembly as recited in claim 15, the assembly further comprising:
a second light source configured to emit a second light beam toward the second side; and
a second detector spaced from the first light source and the first detector along the second direction, the second detector configured to receive the second light beam.

17. The assembly as recited in claim 15, wherein the assembly further comprises:
an optical connector that includes the second light source and a third detector configured to receive the signal light beam.

18. A method of manufacturing an optical module including a beam steering portion, the method comprising:
forming a first transparent portion having a first index of refraction such that the first transparent portion includes a 1) first side defining an inner surface that faces the beam steering portion, and 2) a second side defining an inner surface adjacent to the inner surface of the first side, the inner surface of the second side facing the beam steering portion;
forming a second transparent portion having a second index of refraction; and
attaching the first transparent portion to the second transparent portion at a contact surface to define the beam steering portion.

19. The method as recited in claim 18, the method further comprising applying a deformable material at the contact surface of at least one of the first and second transparent portions.

20. The method as recited in claim 18, wherein the method further comprises:
forming one of the first and second transparent portions so as to define a recess; and
placing the other of the first and second transparent portions into the recess.

* * * * *